United States Patent
Tascillo et al.

[11] Patent Number: 5,761,626
[45] Date of Patent: Jun. 2, 1998

[54] SYSTEM AND METHOD FOR DISTINGUISHING AND CHARACTERIZING MOTOR VEHICLES FOR CONTROL OF AUTOMATIC DRIVERS

[75] Inventors: Anya Lynn Tascillo; Mark Anthony Tascillo, both of Canton, Mich.

[73] Assignee: Ford Global Technologies, Inc., Dearborn, Mich.

[21] Appl. No.: 578,354

[22] Filed: Dec. 26, 1995

[51] Int. Cl.⁶ ........................................ G06G 7/70
[52] U.S. Cl. .......................... 701/29; 701/27; 701/30; 73/116
[58] Field of Search .................. 364/431.01, 431.03, 364/431.08, 431.07, 431.04, 424.034, 424.032, 424.058, 424.36, 350, 551.01; 123/425, 436, 478, 419, 399; 477/117, 118, 120, 904, 155, 154, 144; 395/23, 24, 21, 22, 905, 911, 913, 924; 73/116, 117.3, 117.2

[56] References Cited

U.S. PATENT DOCUMENTS

| | | | |
|---|---|---|---|
| 4,884,216 | 11/1989 | Kuperstein | 364/513 |
| 5,041,976 | 8/1991 | Marko et al. | 364/424.03 |
| 5,075,868 | 12/1991 | Andes et al. | 395/23 |
| 5,087,826 | 2/1992 | Holler et al. | 307/201 |
| 5,093,899 | 3/1992 | Hiraiwa | 395/23 |
| 5,124,918 | 6/1992 | Beer et al. | 364/424.02 |
| 5,129,039 | 7/1992 | Hiraiwa | 395/24 |
| 5,182,794 | 1/1993 | Gasperi et al. | 395/23 |
| 5,193,513 | 3/1993 | Marko et al. | 123/571 |
| 5,200,899 | 4/1993 | Ribbens et al. | 364/431.08 |
| 5,253,329 | 10/1993 | Villarreal et al. | 395/24 |
| 5,278,760 | 1/1994 | Ribbens et al. | 364/431.07 |
| 5,313,407 | 5/1994 | Tiernan et al. | 364/508 |
| 5,361,628 | 11/1994 | Marko et al. | 73/116 |
| 5,390,284 | 2/1995 | Ogata et al. | 395/23 |
| 5,410,477 | 4/1995 | Ishii et al. | 364/424.01 |
| 5,495,415 | 2/1996 | Ribbens et al. | 364/431.08 |
| 5,576,963 | 11/1996 | Ribbens et al. | 364/431.08 |

*Primary Examiner*—Jacques H. Louis-Jacques
*Attorney, Agent, or Firm*—Roger L. May; Donald A. Wilkinson

[57] ABSTRACT

A motor vehicle related operating signal, such as a torque signal produced by operation of an engine of the motor vehicle, is monitored to produce a frequency signature for the vehicle. The frequency signature is filtered by a fuzzy spectral filter to extract a frequency membership for the vehicle which is utilized to generate characteristic signals representative of the vehicle. Signals representative of vehicle inertia (J), vehicle horsepower (HP) and relative vehicle temperature (RVT) are extracted by a radial basis function (RBF) neural network. These characteristic signals are then used to control the vehicle directly via a powertrain control module (PCM) or via a robot driver for vehicle test purposes. For robot control, an anticipated throttle lag and an anticipated brake lag are generated and used to more accurately and repeatedly control the robot to simulate a human driver in following acceleration curves for vehicle testing purposes.

18 Claims, 6 Drawing Sheets

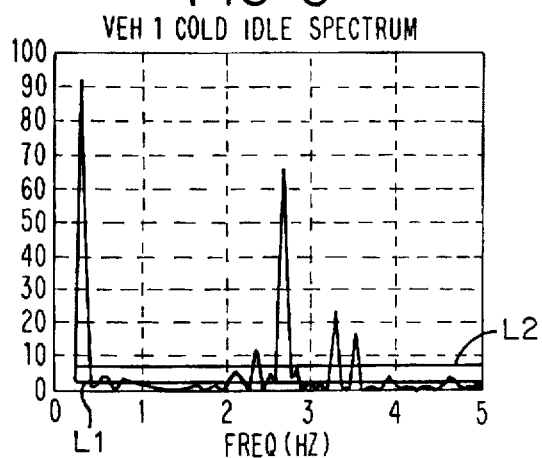
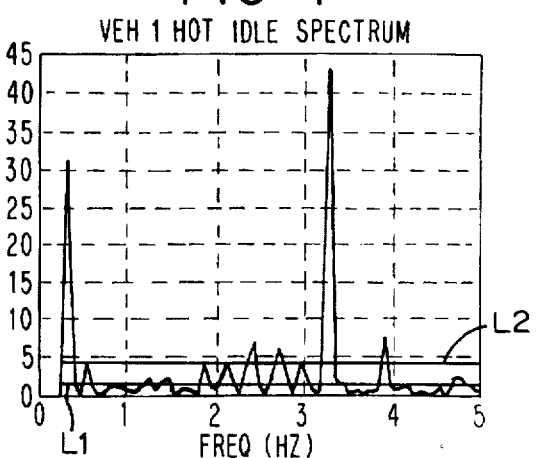
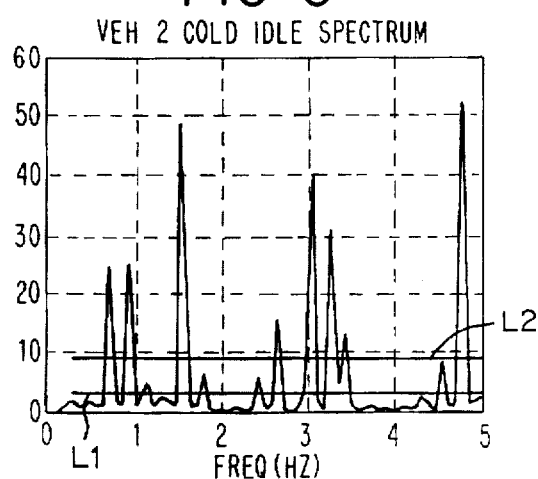
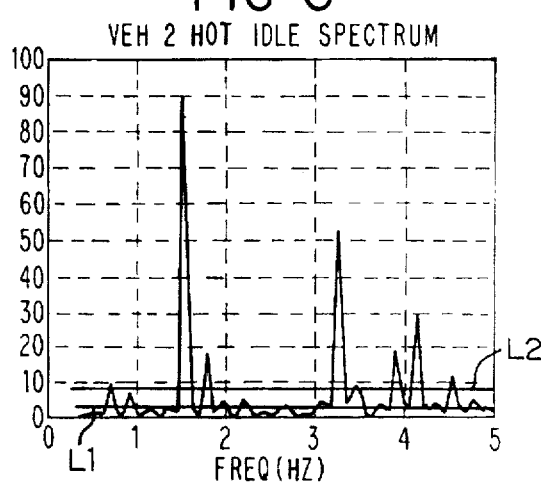
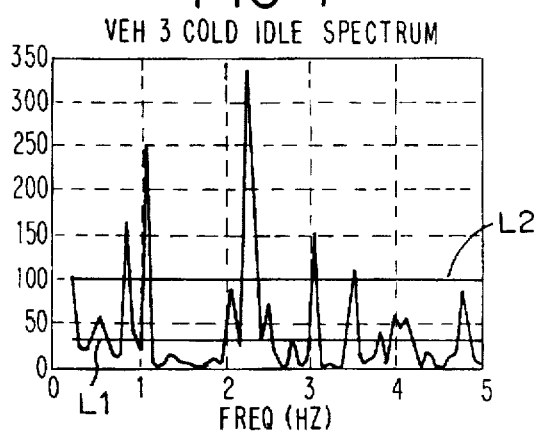
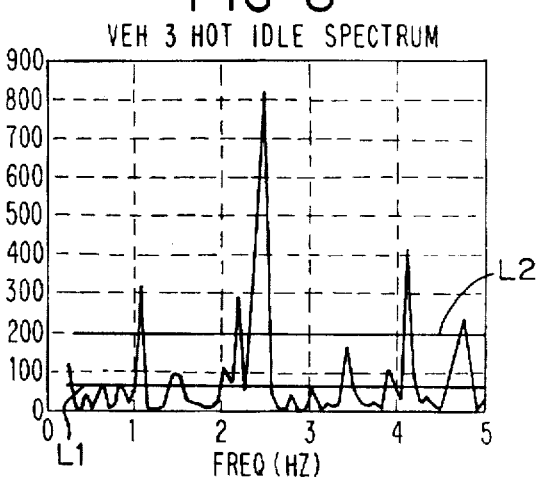

FIG-11
| BRAKE \ THROTTLE | LN | MN | SN | NZ | SP | MP | LP |
|---|---|---|---|---|---|---|---|
| LN | MB | SB | NC | NC | ST | MT | LT |
| MN | MB | SB | NC | NC | ST | MT | LT |
| SN | MB | SB | NC | NC | ST | MT | LT |
| NZ | MB | SB | NC | NC | ST | MT | LT |
| SP | LB | MB | SB | NC | NC | ST | MT |
| MP | LB | LB | MB | SB | NC | NC | ST |
| LP | LB | LB | LB | MB | SB | NC | NC |
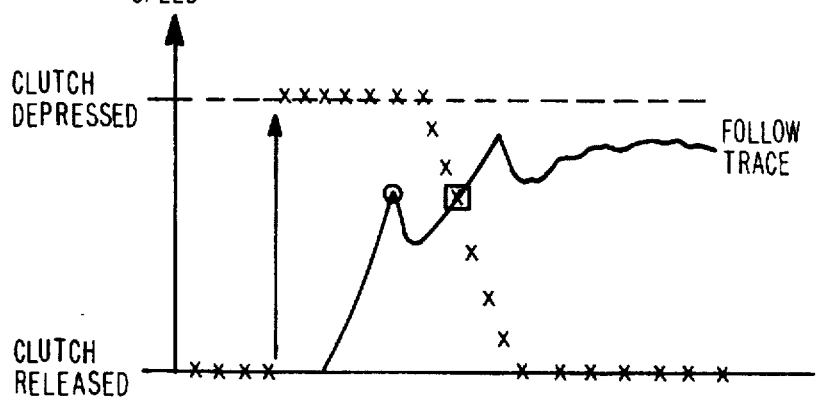
FIG-12
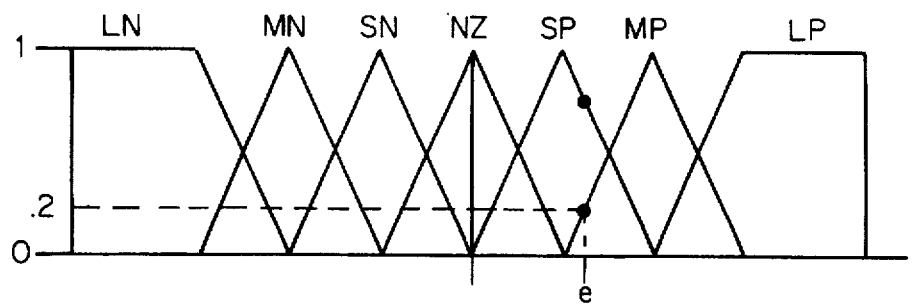
FIG-13

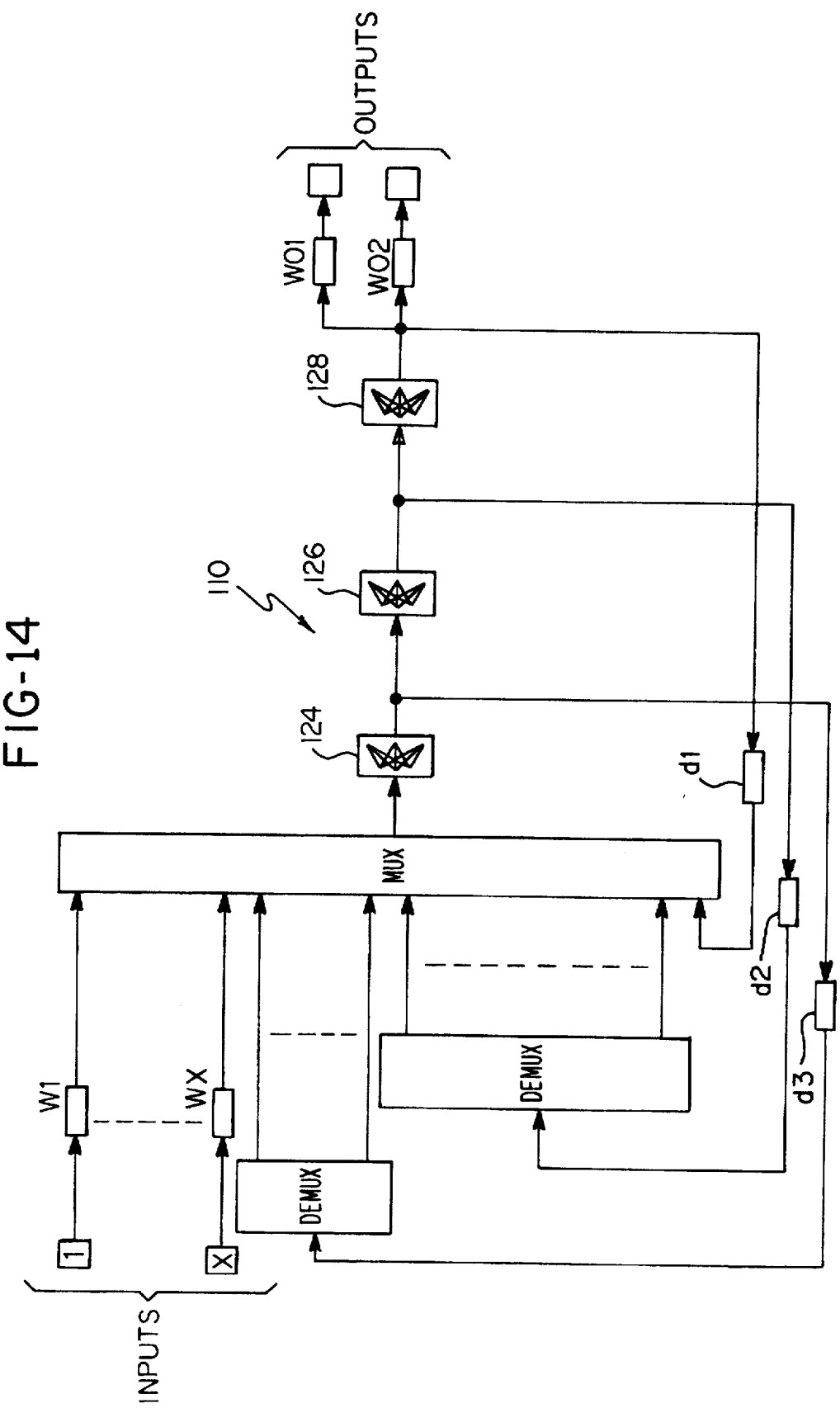

SYSTEM AND METHOD FOR DISTINGUISHING AND CHARACTERIZING MOTOR VEHICLES FOR CONTROL OF AUTOMATIC DRIVERS

BACKGROUND OF THE INVENTION

The present invention relates in general to control and testing of motor vehicles, for example to perform a certification testing sequence required by the Environmental Protection Agency (EPA), and, more particularly, to a system and apparatus for distinguishing and characterizing motor vehicles for control of the operation of the vehicles and/or control of the vehicles by automatic drivers for testing purposes.

Performance of certification testing is very important to motor vehicle manufacturers to ensure that their vehicles meet established federal standards. As an example, a common test is the 1975 cold start exhaust emission test which measures both fuel economy and specific exhaust constituents released while the vehicle is being driven. For this test, a cold vehicle is moved, not driven, to a chassis dynamometer in a test cell where a very specific test is performed on the vehicle. The test comprises: an initial 505 second cold transient period during which the cold vehicle is started and reaches operating temperatures; an 867 second hot stabilized period during which the heated vehicle is operated at normal temperatures; a 600 second soak period during which the vehicle engine is turned off and the vehicle remains parked; and, a 505 second hot transient period during which the vehicle reaches normal operating temperatures after its engine is restarted.

During this federally mandated test, a driving cycle comprising a scheduled velocity trace is matched as closely as possible. As a result of the test, a fuel economy determination is made in miles per gallon, a value which can be expected for city driving conditions. Other driving tests emulate highway speeds, stop-and-go city traffic and high speed accelerations and decelerations. These tests can be performed at selected altitudes and at temperature extremes.

Chassis dynamometers provide rollers which the driving wheels of a motor vehicle ride upon to emulate a road surface. The rollers are of varying diameters, can be single or twin roller and absorb the forces applied by the motor vehicle in one of two ways: hydrokinetically or electrically with the electrical dynamometers offering expanded capabilities in comparison to the hydrokinetical dynamometers. In either event, the dynamometers are computer controlled in response to inertia or weight and horsepower of a vehicle being tested. Periodically, an operator will do a "coastdown" test, i.e., a series of coasts from one speed to another, to determine the status of the dynamometer as to its accurate emulation of road conditions. Coastdown tests are important since they help the operator determine whether numbers from two tests vary due to the dynamometer or site of the test or the motor vehicles being tested.

Repeatability in vehicle testing on dynamometers is critical for providing consistent correlation to real world conditions such that a goal of the tests is to minimize error between a scheduled velocity trace and the actual roll speed of a dynamometer. While human drivers can be used, automatic or robot drivers tend to maximize test repeatability. However, when multiple tests are run with varying time breaks between the tests due, for example, to analyzer start-up, work breaks, lunches, computer problems and the like, the engine is no longer a distinct hot or cold, and its behavior on accelerations varies in a manner perceptible to the human eye and reflected in the fuel economy/emissions numbers but not to existing robot drivers. In addition, repeated decelerations on a dynamometer heat up the brakes to the point where they cannot brake the vehicle to previous braking levels such that previous braking rates become more and more difficult to obtain. If braking is not begun soon enough, the car will not reach idle in time to shift into gear for the next acceleration in a test sequence. Now that additional certification tests are being proposed that demand more rapid accelerations and decelerations, brake fade may very well be a concern for certification testing for some vehicles, e.g., heavy trucks and rear wheel drive cars whose normally strong front brakes are not available for use in the dynamometer setting.

Commercially available robot driver controllers have been successful at following a velocity trace using proportional-integral-derivative (PID) and $H_\infty$ based control approaches; however, the throttle, clutch and braking behavior to achieve the desired velocities has not closely resembled those of a human driving the same trace. In addition, the robots have difficulty driving automobiles significantly different in performance characteristics than those for which they were developed.

Accordingly, there is a need for an improved system and method for distinguishing and characterizing motor vehicles for use for example in controlling robot drivers such that they can more closely approximate the driving performance of human drivers in performing tests of the motor vehicles. In addition, such an improved system and method could be used to control motor vehicles operating characteristics to provide more consistent operation over the operating states of the motor vehicles and over the lifetime of the motor vehicles as they age and their operating characteristics change.

SUMMARY OF THE INVENTION

This need is met by the invention of the present application wherein a motor vehicle related operating signal, such as a torque signal produced by operation of an engine of the motor vehicle, is monitored to produce a frequency signature for the vehicle. The frequency signature is filtered, preferably by a fuzzy spectral filter, to extract a frequency membership for the vehicle which is utilized to generate characteristic signals representative of the vehicle. In an illustrated embodiment of the invention, signals representative of vehicle inertia, vehicle horsepower and relative vehicle temperature are extracted by means of a radial basis function (RBF) neural network. These characteristic signals are then used to control the vehicle directly via a powertrain control module (PCM) or via a robot driver for vehicle test purposes. For robot control, an anticipated throttle lag and an anticipated brake lag are generated and used to more accurately and repeatedly control the robot to simulate a human driver in following acceleration curves for vehicle testing purposes.

In accordance with one aspect of the present invention, a method for determining characteristics of a motor vehicle comprises the steps of: monitoring a torque signal produced by operation of an engine of a motor vehicle; filtering the torque signal to generate component frequency signals representative of component frequencies within the torque signal; and, generating characteristic signals representative of characteristics of the motor vehicle in response to determined component frequencies within the torque signal.

In accordance with another aspect of the present invention, a system for characterizing a motor vehicle comprises a fuzzy spectral filter for filtering a torque signal produced by operation of an engine of a motor vehicle and producing component frequencies within the torque signal. A neural network generates characteristic signals representative of characteristics of the motor vehicle in response to determined component frequencies within the torque signal.

The invention of the present application may be applied to enhance operation of an electronic engine controller of a motor vehicle or a robot vehicle driver when the motor vehicle is on a dynamometer for testing purposes.

It is, thus, a feature of the present invention to provide improved control of a motor vehicle by generating characteristic signals used to enhance operation of the motor vehicle; to provide improved control of a motor vehicle by generating characteristic signals used to enhance control of a robot driver for the motor vehicle during vehicle testing; and, to provide improved control of a motor vehicle by generating characteristic signals used to enhance control of the vehicle over changed operating conditions and the lifetime of the vehicle.

Other features and advantages of the invention will be apparent from the following description, the accompanying drawings and the appended claims.

BRIEF DESCRIPTION OF THE DRAWINGS

FIGS. 3–8 graphically illustrate cold idle and hot idle power spectral densities for three vehicles tested using the invention of the present application;

FIG. 11 is a table used to generate the base throttle or brake to apply in response to signals generated using the rules of FIG. 10;

FIG. 12 graphically illustrates clutch control and throttle control for gear shifts in the test system of FIG. 2;

FIG. 13 illustrates the rules for a gear/clutch fuzzy scheduler of the test system of FIG. 2; and FIG. 14 is a schematic block diagram of a full state feedback recurrent neural network (FSFER) controller of the test system of FIG. 2.

DETAILED DESCRIPTION OF THE INVENTION

The present invention involves distinguishing and characterizing motor vehicles to enhance control of the vehicles. The invention will be described herein with reference to control of motor vehicles by means of automatic or robot drivers for test purposes for which it is initially being applied. However, it is noted that the invention is also applicable to direct control of motor vehicles by means of an electronic engine controller commonly referred to as a powertrain control module (PCM) in the industry during normal operation of the vehicles. Direct control of motor vehicles via a PCM in accordance with the present invention provides more consistent operation or performance over the various operating states of the vehicles and over their lifetimes as they age and their operating characteristics change. Control of robot drivers as well as direct control via a PCM will become apparent from the following description.

Figure 1:
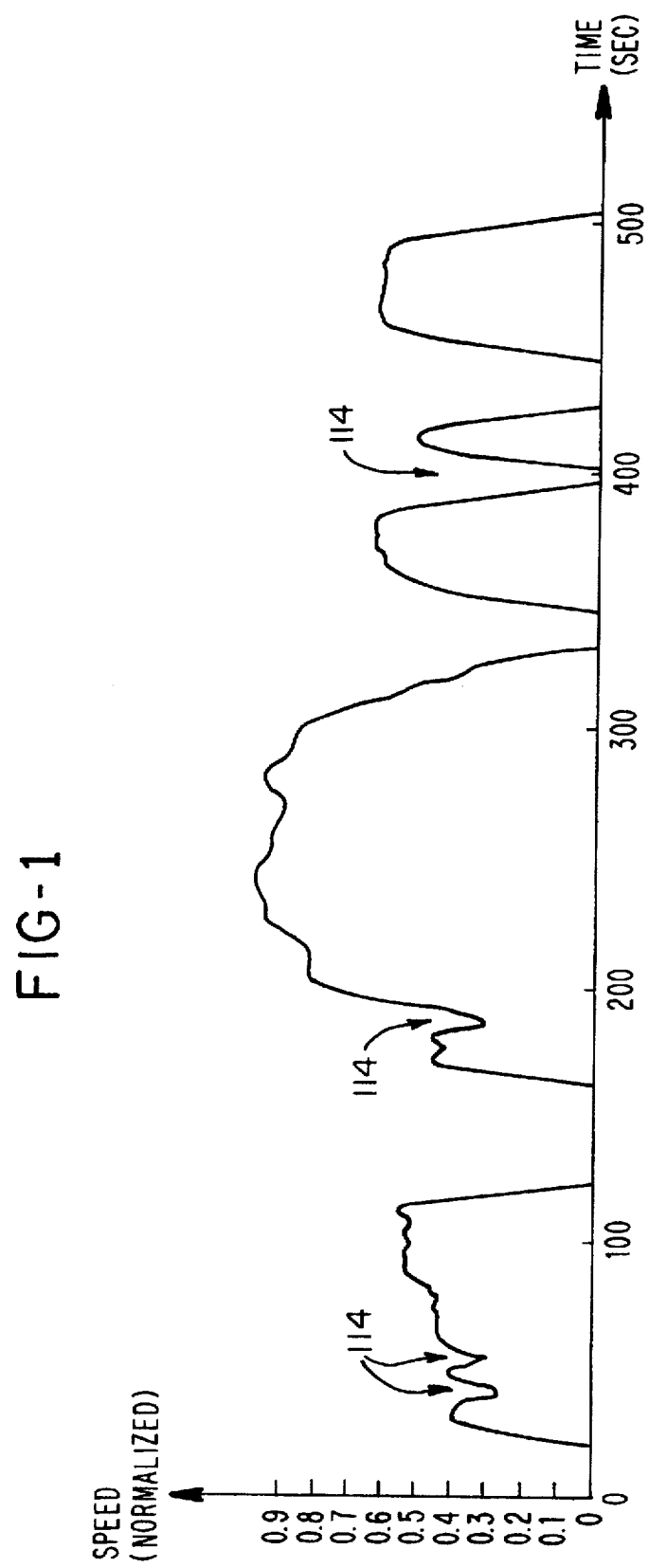
FIG. 1 is a graph of a scheduled velocity curve of the first 505 seconds of the 1975 cold start exhaust emission test.

For control of a robot driver, the invention of the present application operates to provide reduced error between a scheduled velocity curve, for example as shown in FIG. 1, and the actual roll speed of a motor vehicle dynamometer. When a human driver controls a vehicle being tested, throttle, clutch and brake movements are controlled in reaction to velocity error relative to the scheduled velocity curve as viewed on a computer screen called the driver's aid. With time, a driver learns that it is inadequate to react only to current speed error. Thus, by recalling previous control experiences, a human driver learns to apply pedal movements in anticipation of a lag in the vehicle response. These lags can vary due to vehicle inertia (J) or weight, vehicle horsepower (HP), the vehicle/engine temperature relative to a normal temperature, i.e., relative vehicle temperature (RVT) and the time the vehicle has been continuously testing on a given dynamometer.

One example of an inertia, temperature and time dependent error which requires on-line driver adaptation is brake fade. If a human driver finds that a greater brake force is needed to slow a vehicle as a test progresses due to heating of the vehicle brakes and dynamometer, the driver learns to apply the brake sooner and/or to use less throttle as the next planned braking operation approaches.

Two constraints are added to the problem of diagnostics and adaptive control in an environment where vehicles and functional variations of vehicles change several times daily on a given dynamometer. The first is to implement diagnostics and control that is easily integrated with or uses hardware and software already within the laboratory. Otherwise, extra equipment must be purchased, stored and maintained. In addition, data acquisition at high sampling rates is not always available or desired in an industrial testing environment. Most data collection is not necessary at rates greater than one to ten samples per second, and greater sample rates have both processing and storage ramifications. Lower sampling rates, however, cannot accurately capture the behavior of systems which require better control of their transient responses. The invention of the present application can reliably extract useful information at available data sampling rates and also remain flexible to upgrades in rates of data acquisition and control.

The second constraint is the need to avoid increasing vehicle preparation or test time. The present invention satisfies this requirement by acquiring necessary data while a vehicle parameter is not under active control, i.e., for example at idle for throttle or before deceleration for brake, without interaction with the vehicle's computer control, which would have to be manually interfaced, and without installation of extra sensors during test preparation.

Repeatability in vehicle testing on dynamometer rollers is critical for providing automotive engineers with a consistent correlation to real world conditions. Commercially available robot driver controllers have been successful in following a velocity trace using PID and $H_∞$ based approaches, but the throttle, clutch, and braking behavior to achieve the desired velocities has not closely resembled that of a human driving the same trace. In addition, the robots have difficulty driving motor vehicles significantly different in performance characteristics than those for which they were developed.

A number of vehicle control robots are available commercially and are represented by a robot 10 shown in FIG.

9. The robot 10 is marketed under the trademark Robotest by WITT GmbH of Germany. As illustrated, the robot 10 is secured to a steering wheel 12 of a vehicle to be controlled. Shifting is controlled by a servo mechanism 14 while throttle, brake and clutch, for manual transmission vehicles, are controlled by servo controlled extensions 16 which are moved between a seat 18 of the vehicle and the vehicle pedals to be controlled.

In the present invention, neural networks and fuzzy logic are used in the diagnostic adaptive control of a robot driver to reduce dynamometer slip, insufficient braking, and other errors due to motor vehicle, dynamometer and environmental variations. The resulting robot driver and controller can be employed to more accurately compare test sites, motor vehicles, and engine controller strategies. By reducing the variability from vehicle to vehicle and test run to test run, the resulting controllers can be used in error propagation studies to further reduce other sources of variability in the test process.

In particular, in accordance with the present invention a vehicle's state is extracted from its frequency signature which is obtained while the vehicle is idling on a dynamometer just before a desired velocity trace begins. The vehicle state information is passed to fast response neural networks and fuzzy logic schedulers which can stably adjust the weights of default controllers to provide a timely and accurate response to any given velocity command trace. Neural networks and fuzzy logic are known for diagnostic and control functions and provide a major advantage in implementing nonlinear functions in terms of speed of computation which is performed by a series of adds, multiplies and conditional statements. Computations that might otherwise require several iterative passes through formulae connected by several conditions and look up tables can thus be condensed into one forward pass through dedicated modules.

Figure 2:
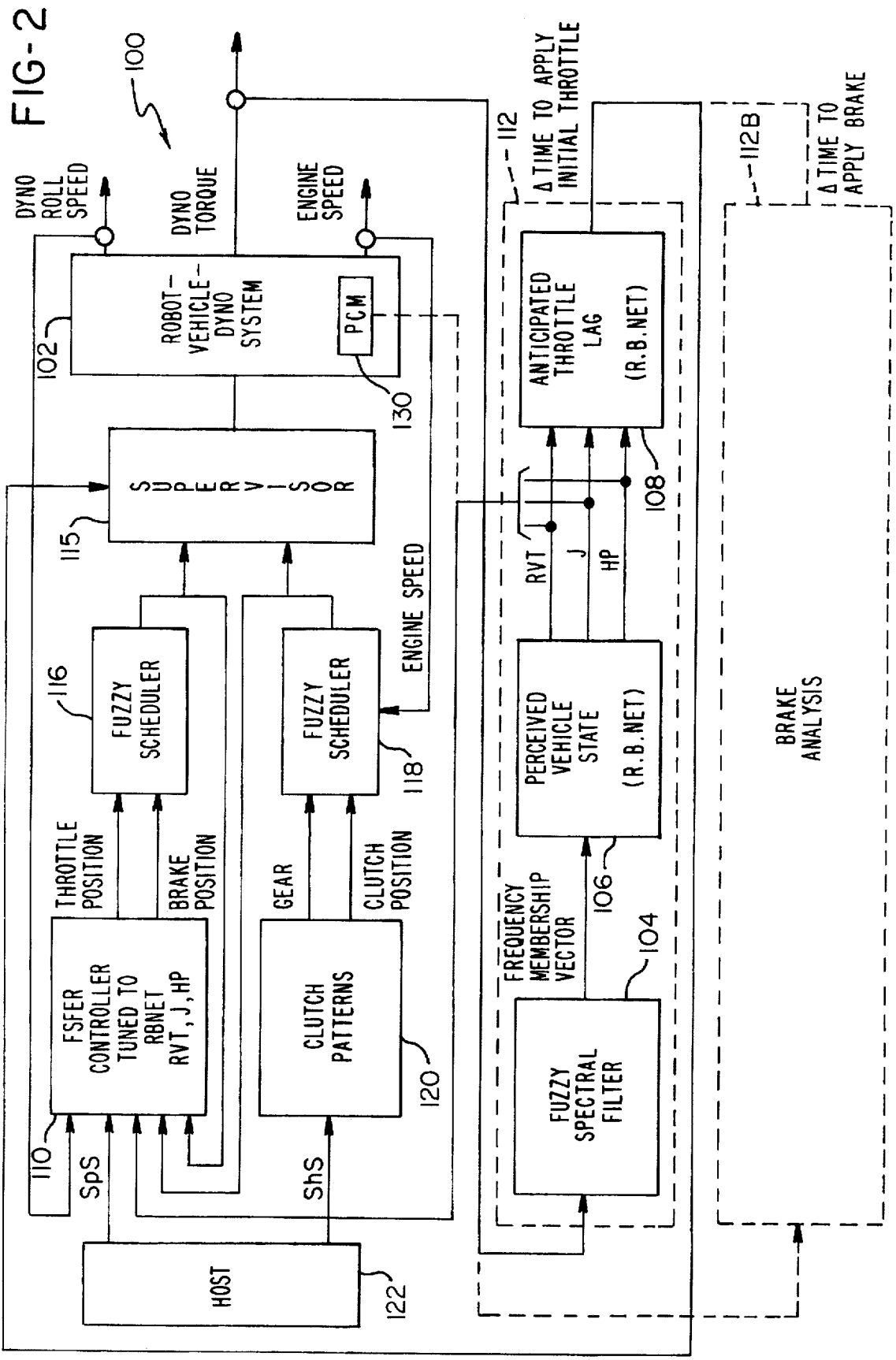
FIG. 2 is a schematic block diagram of a test system including the invention of the present application for controlling a combination of a robot, a motor vehicle and a dynamometer.
Figure 9:
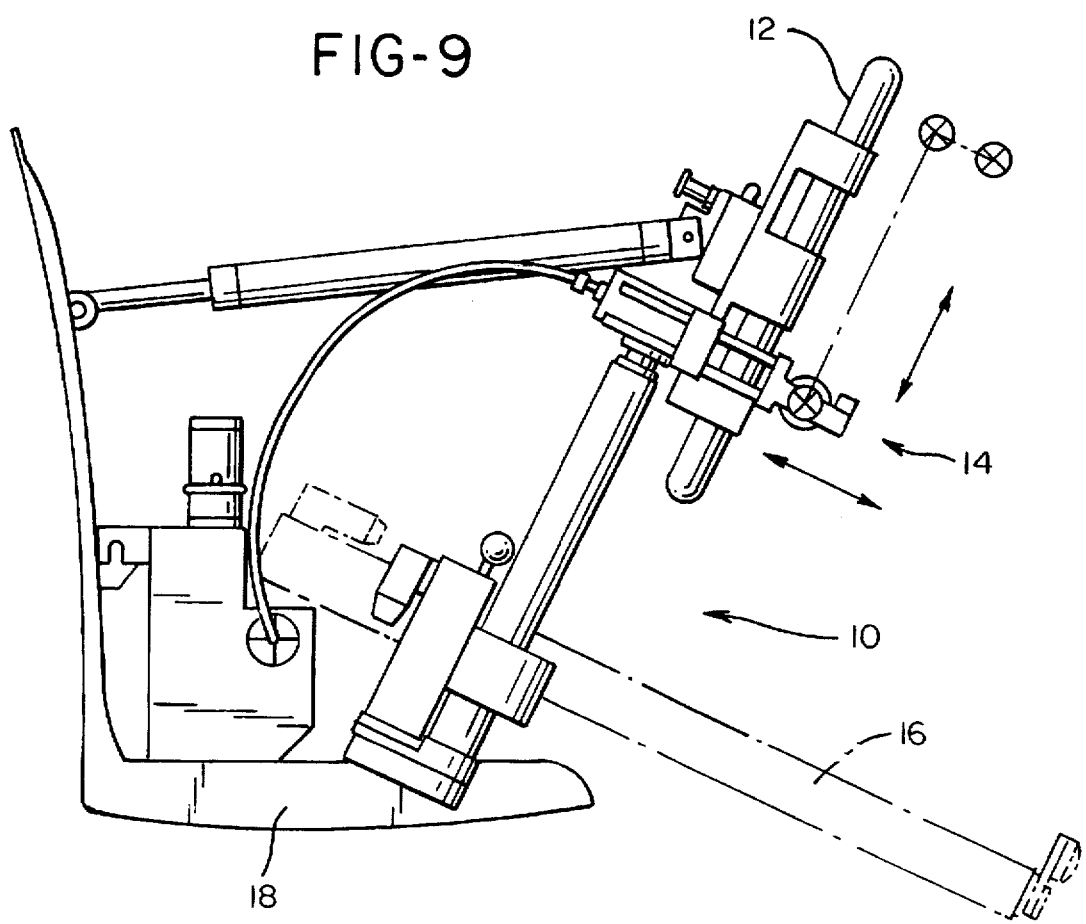
FIG. 9 is a side view of a motor vehicle control robot secured within a vehicle seat.

Reference will now be made to FIG. 2 which illustrates, in schematic block diagram form, a test system 100 including the invention of the present application for a robot driver of a motor vehicle positioned on a dynamometer. The combination of a robot-vehicle-dynamometer is represented by a block 102. Two signals, velocity or dynamometer roll speed and dynamometer torque, are readily available from the dynamometer and both are dependent upon the vehicle positioned upon the dynamometer. Dynamometer torque, being a higher order signal, contains more useful information than roll speed and accordingly was selected as the signal from which to extract the frequency signature of the vehicle on the dynamometer. Accordingly, the signal representative of dynamometer torque is processed by a fuzzy spectral filter 104. A significant frequency database is established in the fuzzy spectral filter 104 for representative vehicle types to be tested on the dynamometer.

Power spectral densities are calculated for dynamometer torque signals taken during an idle period before ignition, i.e., before the vehicle engine is started, to determine the ambient background noise associated with the robot-vehicle-dynamometer system 102. Power spectral densities are also calculated for dynamometer torque signals after ignition, i.e., after the vehicle engine is started and between velocity "hills" along the desired trace as they occur, see FIG. 1. A power spectral magnitude response (PSMR) is determined by dividing each idle spectrum by the preignition spectrum in order to characterize the gain introduced by the running vehicle over background noise. Since idle periods can vary significantly in length from seconds to minutes during specific tests, the number of samples for each idle spectrum was limited to less than 128 points in a working embodiment. Preignition data of as few as 47 samples was used in conjunction with idle spectrums before and after the first velocity "hill" to generate spectra such as those shown in FIGS. 3–8 wherein common frequencies of large magnitude have been removed.

Due to the limited number of data points, the magnitudes and frequency locations of each peak can not be relied upon in a strict sense. Also, high frequencies tend to be exaggerated and low frequencies tend to be lost in the noise background. In order to best extract significant frequencies for a given vehicle category, significant frequencies for representative vehicles are arranged in a reference vector and gaussian membership functions centered about each frequency are used as rules for the fuzzy spectral filter 104. After the six largest magnitudes of a candidate spectrum are subtracted, a line L2 that is three times the average value L1 of the remaining magnitudes is used as a minimum magnitude threshold for the selection of candidate frequencies, see FIGS. 3–8.

Three dimensional membership gaussian functions are centered upon the significant frequencies which are representative of vehicle types to be tested. In a working embodiment of the present invention, two frequencies were selected for each vehicle type to be tested. Of course, more frequencies could be selected in the present invention if desired. Frequencies which pass within the area of a membership gaussian are assigned a membership value and added to any previous membership values in that vector location. For more information the reader may refer to texts and technical articles written on the subject of fuzzy logic such as: *Neural Networks and Fuzzy Systems*, Kosko, Prentice Hall 1992 which is incorporated herein by reference.

Nonzero membership values can then be summed across frequencies for a candidate vehicle and compared to those for the other vehicles in a candidate vector. As noted, two frequencies were used to represent each vehicle for a working embodiment. Alternately, as illustrated in FIG. 2, nonzero membership values are left unsummed and entered into a perceived vehicle state (PVS) radial basis function (RBF) neural network 106 for classification. The RBF neural network 106 receives the nonzero frequency membership vectors and hence has a corresponding number of input nodes, eight in a working embodiment. RBF neural networks are well known in the art and the RBF neural network 106 has one hidden unit layer with the number of nodes in the hidden layer being dependent upon the generation of the RBF neural network 106. Finally, the RBF network 106 has three output nodes which generate signals representative of vehicle inertia (J), vehicle horsepower (HP) and relative vehicle temperature (RVT).

Radial basis function neural networks form a nonlinear mapping of a parameter space with gaussian functions which are generally overlapping. Given an input vector to be classified, the outputs of these, gaussians are weighted and summed to produce a suggested category value. For more information on radial basis function neural networks as well as neural networks in general, the reader may refer to texts and technical articles written on the subject of neural networks and parallel processing such as: *Understanding Neural Networks, Volume 2: Advanced Networks*, Caudill and Butler, The MIT Press, Cambridge, Mass. 1992 which is incorporated herein by reference.

The radial basis neural network 106 was trained to determine: the relative vehicle temperature (RVT), cold (−10) or hot (+10) which is determined by a relative change in magnitude of a particular frequency for each vehicle; the vehicle's normalized inertia (J/1000); and, the vehicle's dynamometer horsepower (HP), given a vector of frequency memberships for 5 representative vehicles. For example, vehicle 1: a heavy weight rear wheel drive pickup truck; vehicle 2: a light weight front wheel drive automobile; vehicle 3: a light weight rear wheel drive automobile; vehicle 4: a medium weight front wheel drive automobile; and, vehicle 5: a heavy weight high performance rear wheel drive automobile. The neural network 106 was trained on the first four vehicles and then tested on the fifth vehicle. The following training/testing example was used for a working embodiment of the invention.

| Training Inputs (Frequency memberships) | Outputs (RVT, J, HP) |
|---|---|
| [1.74 .35 .05 0 0 .91 .9 0] | [−10 8.0 19.4] |
| [.84 1.02 .05 0 0 .91 .9 0] | [10 8.0 19.4] |
| [.84 .04 .46 0 0 .75 0 0] | [−10 8.0 19.4] |
| [.84 .35 .44 0 0 .75 0 0] | [10 8.0 19.4] |
| [0 .02 .44 1.0 0 .76 0 0] | [−10 3.25 7.0] |
| [0 .02 1.0 1.0 0 .12 .11 0] | [10 3.25 7.0] |
| [.35 .37 .37 .44 0 0 .02] | [−10 3.25 7.0] |
| [0 0 1.37 .03 .97 .11 0 .35] | [10 3.25 7.0] |
| [0 .35 .07 0 .97 1.11 0 .35] | [−10 3.375 6.2] |
| [0 0 .07 0 .97 1.11 0 .35] | [10 3.375 6.2] |
| [0 .02 .79 0 .97 .76 .84 .35] | [−10 3.375 6.2] |
| [0 0 .79 .02 .97 .75 .84 .38] | [10 3.375 6.2] |
| [.15 .02 .02 0 0 .01 .75 0] | [−10 3.625 8.1] |
| [0 1.37 0 .02 0 0 0 0] | [16 3.625 8.1] |
| [0 .04 .44 0 .4 .75 .84 .97] | [−10 4.25 8.9] |
| [.15 .02 0 .73 .40 0 0 .97] | [10 4.25 8.9] |
| [0 .02 0 .35 .97 .2 .84 .38] | [−10 4.25 8.9] |
| [0 0 0 .35 0 .2 .84 .03] | [10 4.25 8.9] |

| Test Inputs | Network Outputs | Actual Values |
|---|---|---|
| [.99 0 0 0 1.32 0 1.7 1.32] | [−10 3.98 8.98] | [−10 4.25 8.9] |
| [99 0 0 0 .35 0 1.7 .97] | [10 4.28 9.78] | [10 4.25 8.9] |

Considering that the training examples were sparse at the high weight end of the motor vehicles, only one vehicle with higher weight value, the approximations for the test motor vehicle, vehicle 5, example are very close to the actual values, despite the seemingly dissimilar membership vectors. The RVT outputs are automatically rounded to their relative extremes of −10 or 10.

The outputs of the RBF network 106, i.e., relative vehicle temperature (RVT), cold (−10) or hot (+10), its normalized inertia (J/1000), and its dynamometer horsepower (HP) are passed to an anticipated throttle lag (ATL) radial basis function (RBF) neural network 108. The REF neural network 108 uses these outputs as inputs to produce a suggested lag, or time before change in scheduled speed to apply the throttle initially before the dynamometer begins to move. After the dynamometer begins to move, a full state feedback recurrent neural network (FSFER) controller 110, controls the robot in response to the roll speed signal generated by the dynamometer of the robot-vehicle-dynamometer system 102 to follow the velocity hills along the desired trace as they occur.

A working embodiment of the RBF neural network 108 was programmed to predict throttle lag from a limited number of examples. All examples used were for warm engines. Rather than a single throttle lag, two lag values are determined: low lag which is the time between first throttle motion and some nonzero dynamometer roller velocity; and, high lag which is the time between first throttle motion and a major change in dynamometer roller velocity, i.e., a change of roller speed from zero to approximately 3 MPH. A low lag and high lag allow a robot to better simulate a human driver by providing an initial slight depression of the throttle in response to low lag to overcome stiction followed by a substantial depression of the throttle in response to high lag. The gaussian layer weight matrix was a 4×3 (bias weights 4×1), and the linear layer weight matrix was a 2×4 matrix (bias weights 2×1). For such a small training set the results were quite good. The following is a training example. Inputs were dynamometer type (−10 for electric, +10 for hydrokinetic), inertia and horsepower, and outputs were low lag and high lag, both in seconds.

| Inputs | Outputs |
|---|---|
| [−10 3.375 6.2] | [.65 .85] |
| [−10 9.0 19.4] | [.415 1.92] |
| [10 8.0 19.41] | [.40 1.01] |
| [10 3.25 7.0] | [.72 .85] |
| [10 4.0 9.2] | [.60 1.4] |

Tests showing the success of the RBF neural network 108 were run for vehicles with learned dynamometer counterparts:

| Test Inputs | Network Outputs | Actual Lags |
|---|---|---|
| [10 3.375 6.2] | [.6005 .9031] | [.60 1.2] |
| [−10 3.25 7.0] | [.5587 .9084] | [.66 .85] |

And also for a vehicle which the system had not seen before:

| Test Inputs | Network Outputs | Actual Lags |
|---|---|---|
| [−10 4.25 8.9] | [.4009 1.0094] | [.30 1.18] |

The control functions described with regard to throttle control are illustrated as being in a dashed line throttle analysis block 112. In a similar fashion, brake analysis can be performed by an identical series of operations illustrated by a dashed line brake analysis block 112B. The brake analysis is performed at times when vehicle brakes are applied to conform the dynamometer roll speed to a scheduled velocity curve, such as the valleys 114 in the velocity curve of FIG. 1. The brake analysis of the block 112B generates a brake lag Δtime to compensate for brake fade. Both the throttle lag Δtime to apply initial throttle and the brake lag Δtime are passed to a supervisor 115. The supervisor 115 receives signals from a first fuzzy scheduler 116 which generates throttle and brake signals and a second fuzzy scheduler 118 which generates gear signals (and clutch signals for manual transmission vehicles). The first fuzzy scheduler 116 will now be described with reference to FIGS. 10 and 11.

Figure 10:
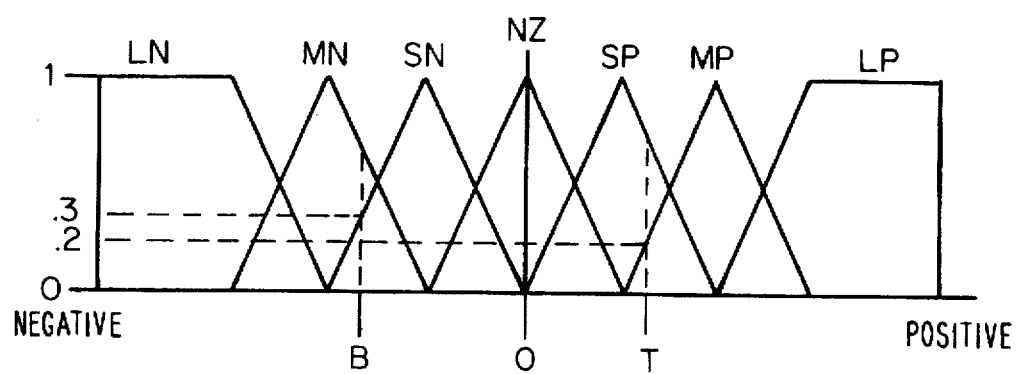
FIG. 10 illustrates the rules for a throttle/brake fuzzy scheduler of the test system of FIG. 2.

FIG. 10 illustrates the rules for the fuzzy scheduler 116 which receives suggested throttle position signals and suggested brake position signals from the controller 110 and processes those signals to generate throttle and brake control signals which are passed to the supervisor 115 to control the robot of the robot-vehicle-dynamometer combination 102. In FIG. 10, the rules include: NZ—near zero; SP—small positive; MP—medium positive; LP—large positive; SN—small negative; MN—medium negative; and, LN—large negative. FIG. 11 is a table which generates the base throttle or brake application control and is accessed using the minimums of the results from the rules of FIG. 10. The following brake and throttle outputs are included in the table of FIG. 11: ST—small throttle; MT—medium throttle; LT—large throttle; SB—small brake; MB—medium brake; LB—large brake; and, NC—no change.

An exemplary operation of the first fuzzy scheduler will now be described with reference to FIGS. 10 and 11. A throttle input T results in intersections with SP and MP with the minimum value of the two being taken on MP and being 0.2 in value. A brake input B results in intersections with SN and MN with the minimum value of the two being taken on SN and being 0.3 in value. The table of FIG. 11 is then entered using MP for throttle and SN for brake and results in a base output of MT medium throttle. Medium throttle MT corresponds to a given throttle pressure or other throttle control parameter which is then multiplied by the maximum of the minimums taken from the rules of FIG. 10, i.e., 0.3. Thus, the resulting output is 0.3 multiplied by the throttle pressure or other control parameter which is represented by medium throttle MT. No brake will be applied since the test system 100 is designed to only apply brake or throttle, never both, at the same time. While a "maximum of the minimums" was used to defuzzify the output of the first fuzzy scheduler 116, other defuzzifiers can be used as will be apparent to those skilled in the art.

The second fuzzy scheduler 118 operates substantially the same as the first portion of the first fuzzy scheduler 116 and hence is somewhat simplified. Clutch and engine speed for a typical shift from idle (neutral or 0 gear) to first gear are illustrated in FIG. 12. The clutch is fully depressed and the engine speed is brought to a user chosen speed, such as 3000 RPM, to be close to necessary speed for a proper shift to occur. Clutch patterns defining the gear and clutch position for a given car are stored in a clutch pattern memory 120 with the speed schedule, shift schedule and overall control of the test system 100 being provided by a host computer 122, see FIG. 2.

With regard to the second fuzzy scheduler 118, the chosen engine speed for a given gear shift is compared to the actual engine speed to determine an engine speed error e which is entered on the horizontal axis of the graph of the fuzzy rules illustrated in FIG. 13. The lower value rule is chosen and its membership, between 0 and 1, is read from the vertical axis. The rules for FIG. 13 are: NZ—near zero; SP—small positive; MP—medium positive; LP—large positive; SN—small negative; MN—medium negative; and, LN—large negative. For the error e illustrated, the medium positive MP is determined. A throttle value is selected for each rule and that throttle value is multiplied by the membership value to obtain a throttle control signal for performing the shift.

The controller 110 is a full state feedback recurrent neural network (FSFER) whose architecture for the test system 100 is illustrated in FIG. 14. The FSFER controller 110 builds on the basic recurrent neural network, for example the Elman neural network, see *Understanding Neural Networks, Volume 2: Advanced Networks*, supra, by extending to a full three layer architecture with feedback from each of the three layers being brought back to the networks' set of input weights. The FSFER architecture includes first and second tan sigmoid layers 124, 126 and a pure linear (ADELINE) third layer 128. The FSFER architecture differs from traditional recurrent neural networks in that typically, the network would be extended by simply adding more sigmoidal layers to the Elman network. Such extension implies that each layer has a first set of inputs from the previous layer and a second set of inputs corresponding to its old outputs. It is the applicants' opinion that the FSFER network, with all feedbacks brought back as inputs to the very first sigmoidal layer, is easier to design and train than the expanded Elman networks.

In a working embodiment of the invention, the penalty function for training ($\Gamma$) was computed using the sum squared error between the actual required outputs (throttle position and brake position) and the networks computed outputs.

$$\Gamma = \sum_{i=1}^{N} (|T_i| - |out_{6_i}|)$$

Weight updates are preformed by the Levenberg-Marquardt (LM) algorithm which is significantly faster than traditional backpropagation, see *MATLAB Neural Network Toolbox*, Demuth and Beale, The Mathworks 1994 which is incorporated herein by reference. The LM algorithm is derived from Newton's method and uses the following equation:

$$\Delta W = (J^T J + \mu I)^{-1} J^T e$$

where J is the Jacobian error derivative matrix, $\mu$ is a tuning parameter and e is an error vector to enact a weight change $\Delta W$. The training process involved the best 5 complete training runs, where weights started at Nguyen-Windrow initialization, see *MATLAB Neural Network Toolbox*, supra, and then were iterated 30 times. The controller 110 was trained separately for each output. For additional information regarding the FSFER controller 110, the reader can refer to *Neural Network Based System Identification of an Engine Testbed*, Tascillo et al., Proceedings of ESD IPC'95 Conference & Exposition 1995, which is incorporated herein by reference.

The supervisor 115 prioritizes the operations which are preformed by the test system 100 as will now be described. Highest priority (level 1) is given to gear shift control with the second fuzzy scheduler 118 using speed error as an input to suggest changes in throttle position to mesh with the clutch midway through its preprogrammed movement as shown in FIG. 12. The time of execution for a next gear is specified by a next time in the shift schedule provided by a host computer 122 which also defines the gear to be engaged.

Next highest priority (level 2) is given to throttle lag control with execution being similar to gear shift control but being only for initial acceleration in first gear (or second gear for vehicles with creeper first gear). The time of execution is as suggested by the anticipated throttle lag RBF neural network 108 which is counted in negative time from the time that dynamometer roll speed goes nonzero within a long look-ahead time, normally several seconds.

The third highest priority (level 3) is given to brake lag control. The brake force to be applied is generated by the first fuzzy scheduler 116 as described. The time of execution for the brake force is moved back from a prescribed deceleration time by the anticipated brake lag generated by the brake analysis block 112B.

Finally, the lowest priority (level 4) is given to velocity error feedback control. Again, throttle and brake to be applied is generated by the first fuzzy scheduler 116 and the FSFER neural network controller 110 as described. The time of application is as fast as the sample rate collects information and the FSFER neural network controller can respond with a value.

In conclusion, the frequency signature of a vehicle before and after ignition, i.e., starting of the engine, and during braking, is used to distinguish and characterize a motor vehicle or the condition of a motor vehicle for control during operation of the vehicle or testing of the vehicle via a robot. Once the vehicle has been characterized, throttle and brake lags can be determined to more better control the vehicle directly or via a robot if control is to be performed during tests of the vehicle. Neural networks and fuzzy logic are preferred for implementation of the invention; however, other circuits or control arrangements could be used in accordance with the present invention. While the invention has been described with reference to control of robots for in turn controlling vehicles during testing, it is equally applicable to direct control of the vehicles by means of an electronic engine controller commonly referred to as a powertrain control module (PCM) in the industry. For example, the vehicle characterizing signals can be passed to a vehicle PCM 130 as shown in FIG. 2 for fine tuning control of the vehicle.

Having thus described the invention of the present application in detail and by reference to preferred embodiments thereof, it will be apparent that modifications and variations are possible without departing from the scope of the invention defined in the appended claims.

What is claimed is:

1. A method for determining characteristics of a motor vehicle comprising the steps of:
    monitoring a torque signal produced by operation of an engine of a motor vehicle;
    filtering said torque signal to generate component frequency signals representative of component frequencies within said torque signal, by generating a frequency membership vector signal representative of the component frequencies within said torque signal; and
    generating characteristic signals representative of relative temperature, inertia and horsepower of said motor vehicle in response to determined component frequencies within said torque signal by passing said frequency membership vector signal through a neural network.

2. A method for determining characteristics of a motor vehicle as claimed in claim 1 wherein said step of filtering said torque signal comprises the step of passing said torque signal through a fuzzy spectral filter.

3. A method for determining characteristics of a motor vehicle as claimed in claim 1 wherein said step of generating characteristic signals representative of characteristics of said motor vehicle comprises the step of passing said component frequency signals through a neural network.

4. A method for determining characteristics of a motor vehicle as claimed in claim 1 and wherein said method further provides for controlling said motor vehicle and further comprises the step of utilizing said characteristic signals to control operation of said motor vehicle.

5. A method for determining characteristics of and controlling a motor vehicle as claimed in claim 4 wherein said step of utilizing said characteristic signals to control operation of said motor vehicle comprises the step of passing said characteristic signals to an electronic engine controller of said motor vehicle.

6. A method for determining characteristics of and controlling a motor vehicle as claimed in claim 4 wherein said step of utilizing said characteristic signals to control operation of said motor vehicle comprises the step of controlling a robot vehicle driver while said motor vehicle is on a dynamometer.

7. A method for determining characteristics of and controlling a motor vehicle as claimed in claim 6 wherein said step of monitoring a torque signal produced by operation of an engine of a motor vehicle comprises the step of monitoring torque of said dynamometer.

8. A method for determining characteristics of and controlling a motor vehicle as claimed in claim 6 wherein the step of controlling a robot vehicle driver comprises the steps of generating an anticipated throttle lag signal in response to said characteristic signals.

9. A method for determining characteristics of and controlling a motor vehicle comprising the steps of:
    monitoring a torque signal produced by operation of an engine of a motor vehicle;
    filtering said torque signal to generate component frequency signals representative of component frequencies within said torque signal;
    generating characteristic signals representative of characteristics of said motor vehicle in response to determined component frequencies within said torque signal;
    utilizing said characteristic signals to control a robot vehicle driver and thereby operation of said motor vehicle while said motor vehicle is on a dynamometer, robot vehicle driver control including generation of an anticipated throttle lag signal generated in response to said characteristics signals;
    generating speed schedule signals representative of vehicle speed over time for said motor vehicle;
    generating brake and throttle action signals which are passed to said robot vehicle driver in response to a requested throttle position signal, a requested brake position signal and said anticipated throttle lag signal;
    combining said speed schedule signals with a dynamometer roll speed signal, said characteristic signals, and said brake and throttle action signals to generate said requested throttle position signal and said requested brake position signal.

10. A method for determining characteristics of and controlling a motor vehicle as claimed in claim 9 wherein said step of combining said speed schedule signals with a dynamometer roll speed signal, said characteristic signals, and said brake and throttle action signals to generate said requested throttle position signal and said requested brake position signal comprises the step of passing said speed schedule signals, said dynamometer roll speed signal, said characteristic signals, said brake action signal and said throttle action signal through a neural network.

11. A method for determining characteristics of and controlling a motor vehicle as claimed in claim 10 wherein said step of generating brake and throttle action signals comprises the step of passing said requested throttle position signal and said requested brake position signal through a fuzzy logic scheduler.

12. A method for determining characteristics of and controlling a motor vehicle as claimed in claim 11 further comprising the steps of:
    generating shift schedule signals representative of manual gear and clutch operations over time for said motor vehicle;
    generating gear and clutch action signals which are passed to said robot vehicle driver in response to gear position signals, clutch position signals and an engine speed signal; and
    applying said shift schedule signals to clutch patterns to generate said gear position signals and clutch position signals.

13. A method for determining characteristics of and controlling a motor vehicle as claimed in claim 12 wherein said step of generating gear and clutch action signals which are passed to said robot vehicle driver comprises the step of passing said gear position signals and said clutch position signals through a fuzzy logic scheduler.

14. A method for determining characteristics of and controlling a motor vehicle as claimed in claim 9 wherein said robot vehicle driver control further includes generation of an anticipated brake lag signal and said step of generating brake and throttle action signals is further responsive to said brake lag signal.

15. A system for characterizing a motor vehicle and controlling said motor vehicle via a robot vehicle driver, said motor vehicle being on a dynamometer and said system comprising:

- a fuzzy spectral filter for filtering a torque signal produced by operation of an engine of a motor vehicle, said fuzzy spectral filter producing component frequencies within said torque signal;
- a neural network for generating characteristic signals representative of characteristics of said motor vehicle in response to determined component frequencies within said torque signal;
- a neural network for generating an anticipated throttle lag signal in response to said characteristic signals;
- a source of speed schedule signals representative of speed of said motor vehicle over time;
- a fuzzy scheduler for generating brake and throttle action signals which are passed to a robot vehicle driver in response to a requested throttle signal, a requested brake position signal and said anticipated throttle lag signal; and
- a neural network for combining said speed schedule signals with a dynamometer roll speed signal, said characteristic signals, and said brake and throttle action signals to generate said requested throttle position signal and said requested brake position signal.

16. A system for characterizing and controlling a motor vehicle as claimed in claim 15 wherein said system connects said characteristic signals to an electronic engine controller of said motor vehicle.

17. A system for characterizing a motor vehicle and controlling said motor vehicle as claimed in claim 15 further comprising a neural network for generating an anticipated brake lag signal in response to said characteristic signals, said fuzzy scheduler being further responsive to said brake lag signal for generating said brake and throttle action signals.

18. A method for determining characteristics of a motor vehicle on a dynamometer comprising the steps of:

- monitoring a dynamometer torque signal produced by operation of an engine of a motor vehicle;
- filtering said dynamometer torque signal to generate component frequency signals representative of component frequencies within said torque signal by generating a frequency membership vector signal representative of the component frequencies within said torque signal; and
- generating relative temperature, inertia and horsepower signals representative of characteristics of said motor vehicle in response to determined component frequencies within said dynamometer torque signal by passing said frequency membership vector signal through a neural network.

\* \* \* \* \*